United States Patent [19]
Urs et al.

[11] Patent Number: 6,148,204
[45] Date of Patent: Nov. 14, 2000

[54] METHOD AND APPARATUS FOR A DISTRIBUTED LOCATION REGISTER

[75] Inventors: Kamala Diane Urs, Bartlett; Michael D. Sasuta, Mundelein; Mark L. Shaughnessy, Algonquin, all of Ill.

[73] Assignee: Motorola, Inc., Schaumburg, Ill.

[21] Appl. No.: 08/929,159

[22] Filed: Sep. 12, 1997

[51] Int. Cl.[7] .............................. H04Q 7/20; H04Q 7/00
[52] U.S. Cl. ........................ 455/435; 455/433; 455/439; 455/456; 370/331
[58] Field of Search ................................. 455/435, 432, 455/433, 438, 439, 445, 448, 456; 370/328, 331

[56] References Cited

U.S. PATENT DOCUMENTS

| | | | |
|---|---|---|---|
| 5,606,596 | 2/1997 | Jain et al. | 379/59 |
| 5,610,974 | 3/1997 | Lantto | 379/59 |
| 5,640,386 | 6/1997 | Wiedeman | 370/320 |
| 5,862,481 | 1/1999 | Kulkarni et al. | 455/432 |

OTHER PUBLICATIONS

Nodera et al. Interworking between GSM and PDC through IC cards, IEEE pp. 761–765, Jun. 1995.

*Primary Examiner*—Fan Tsang
*Assistant Examiner*—Sheila Smith
*Attorney, Agent, or Firm*—Steven R. Santema

[57] ABSTRACT

A method and apparatus for utilizing a distributed location register (20 or 22) within a wireless communication system (10) is accomplished by a distributed location register which receives a request for updating communication parameters of a particular communication entity, which may be a communication device, group of communication devices, or grouping of groups of communication devices, or for retrieval of communication parameters of the particular communication entity. To process the request, the distributed location register (20 or 22) interprets it to identify one of a plurality of communication service registers (28–32, 102–112, or 136–140) which stores the communication entity's communication parameters. Having identified a particular communication service register, the communication service register receives, and subsequently processes, the request to retrieve the communication parameters of interest and/or update the communication parameters of interest.

14 Claims, 11 Drawing Sheets

6,148,204

METHOD AND APPARATUS FOR A DISTRIBUTED LOCATION REGISTER

TECHNICAL FIELD OF THE INVENTION

The present invention relates generally to communication systems and more particularly to home location registers and visitor location registers.

BACKGROUND OF THE INVENTION

Communication systems are known to include a plurality of communication devices and supporting infrastructure. Each of the communication devices has an individual access code which allows the supporting infrastructure to accurately process requested services by a communication device. Such is the case for a wireless communication system that may support cellular telephony (i.e., typical telephone services such as call-waiting, call-forwarding, three-way calling, etc.), land mobile communications (i.e., one to many communications) and dispatch communications (i.e., a dispatcher communicating with an individual and/or group of communication devices).

In a typical wireless communication system, a communication device may be a cellular telephone, a mobile radio, a portable radio, a personal digital assistant (PDA), a modem, or any combination thereof. The supporting infrastructure includes a plurality of base stations, groups of which are coupled to a base station controller. Groups of base station controllers are coupled to service processors, which in turn, are coupled to a public switched telephone network (PSTN). The service processors may be a mobile switching center, a dispatch service processor, or a mobile data gateway. With the base station controllers coupled to a mobile switching center, a dispatch service processor and/or a mobile data gateway, the affiliated communication devices of the base station controller may participate in group communications, private communications, telephony services, dispatch services, and/or data transfers.

A wireless communication system also includes at least one home location register and a plurality of visitor location registers. Typically, one visitor location register (VLR) is coupled to each service processor in the communication system. The VLR typically contains communication device profiles (i.e., a communication unit identification code, a group identification code, and a set of communication parameters) for each communication device affiliated with the service processor. The home location register (HLR) contains similar information, but for every communication device registered with the communication system. For example, a communication system may be providing wireless communication services for the Chicago metropolitan area. The communication system includes a plurality of communication system areas for particular regions within the communication system. For example, a communication system area may be for downtown Chicago area, north Chicago area, south Chicago area, west Chicago area, and one for each of the surrounding suburbs.

In this example, one HLR would support the communication system, assuming only one service provider is present, and each service processor in each communication system area would have its own VLR. Each communication device which is registered in the communication system will have its profile stored in the HLR and, depending on which communication system area the communication device is currently located, the appropriate VLRs of the communication system area will also contain the communication device's profile. When the communication device relocates to a different communication system area, the VLR of the service processors in the new communication system area communicate with the HLR to retrieve the communication device's profile.

Predictably, the HLR for such a system contains a massive amount of information. Currently, the HLR can process the request from the plurality of the VLRs in a reasonable time. But, as the communication system offers more and more services, new service processors are added to each communication system area to support such services. When a new service processor is added to a communication system area, the HLR needs to be rewritten to include the relevant information for the new service processor.

As more and more services are offered by a communication system, more and more requests from the VLRs will be generated, creating a data processing bottleneck at the HLR. Such a bottleneck will limit the scalability of the communication system and slow the throughput of data. Therefore, a need exists for a method and apparatus that allows the communication system to offer more and more services without creating a data processing bottleneck and without limiting the scalability of the communication system.

DESCRIPTION OF A PREFERRED EMBODIMENT

Generally, the present invention provides a method and apparatus for utilizing a distributed location register within a wireless communication system. This is accomplished by a distributed location register which receives a request for updating or accessing communication parameters for a particular communication entity, or for retrieval of communication parameters of the particular communication entity. Note that a communication entity is a communication device, a group of communication devices, or a grouping of groups of communication devices. To process the request, the distributed location register interprets it to identify one of a plurality of communication service registers which stores the communication entity's communication parameters. Having identified a particular communication service register, the communication service register receives, and subsequently processes, the request to retrieve the communication parameters of interest and/or update the communication parameters of interest.

By incorporating a distributed location register in a wireless communication system as a home location register (HLR) and/or as a visitor location register (VLR), the wireless communication system is scaleable to include a plurality of services without creating a bottleneck at the HLR or VLR. This is possible because each of the plurality of the communication service registers, within the distributed location register, primarily processes communication parameters related to a particular type of service. For example, a communication service register may process communication parameters for telephony services, while another communication service register processes communication parameters for dispatch service, while yet another processes communication parameters for any one of mobile data services, video services, multimedia services, or packet data services.

Figure 1:
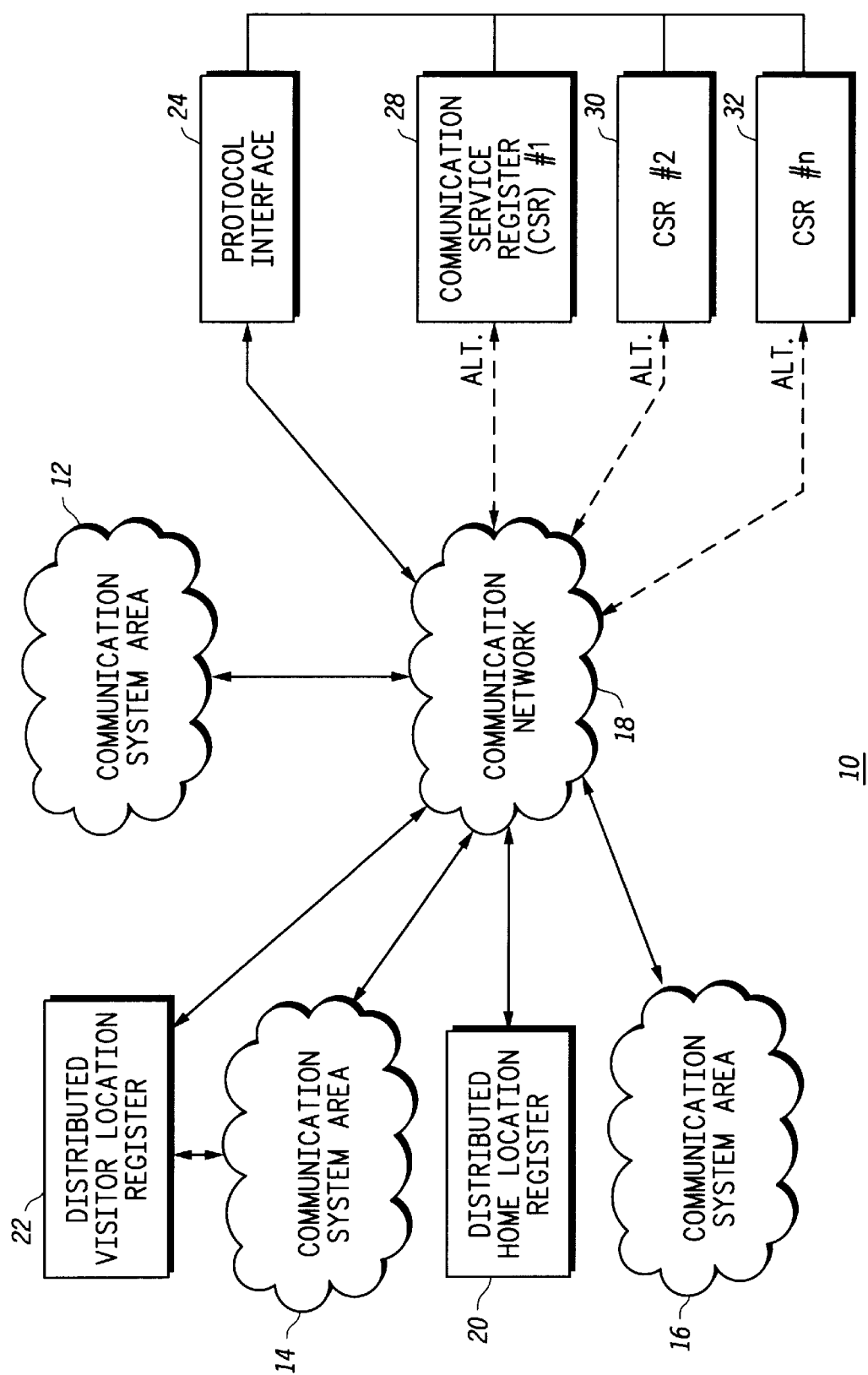
FIG. 1 is a schematic block diagram of a communication system which is in accordance with the present invention.

The present invention can be more fully described with reference to FIGS. 1–15. FIG. 1 is a schematic block diagram of a communications system 10 that includes a plurality of communication system areas 12, 14, 16, a communication network 18, a distributed home location register 20, a distributed visitor location register 22, a protocol interface 24, and a plurality of communication service registers (CSR) 28, 30, and 32. The communication network 18 comprises at least one of a public switched telephone network (PSTN), the Internet, satellite communication infrastructure, asynchronous transfer mode (ATM) communication infrastructure, and/or any other private, national and/or global data conveyance medium.

In a first embodiment, a distributed location register is a single entity, as shown by the distributed home location register 20 and the distributed visitor location register 22. In a second embodiment, the distributed location register is a plurality of individual entities that provide the distributed location register functionality, such as the protocol interface 24 and the plurality of communication service registers 28–32. As shown, the plurality of communication service registers 28–32 are coupled to the protocol interface 24 directly or are coupled to the protocol interface 24 through the communication network 18.

Communication system area 14 is shown to be coupled to a distributed visitor location register 22, which is coupled to the communication network 18. As shown, the entire communication system area 14 may have a single distributed visitor location register operably coupled thereto. In this embodiment, the distributed visitor location register 22 would provide all of the VLR functionality for each service processor within the communication system area 14. Thus, if the communication system area 14 includes a plurality of dispatch service processors, a plurality of video service processors, and a mobile switching center service processor, the distributed VLR 22 would process all of the VLR functionality for each of the mentioned service processors.

Figure 2:
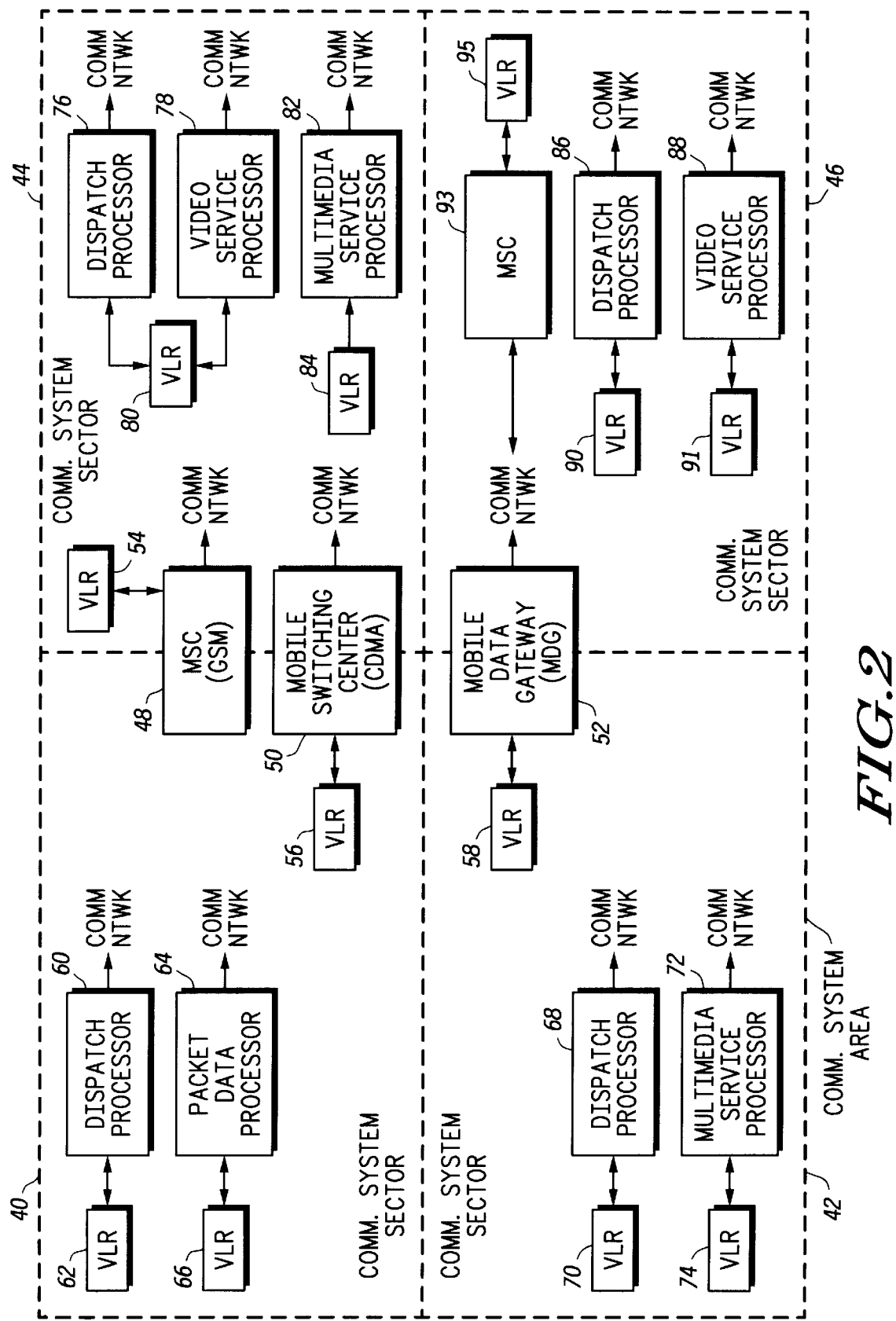
FIG. 2 is a schematic block diagram of a communication system area which is in accordance with the present invention.

FIG. 2 is a schematic block diagram of a communication system area 12 and 16 which includes a plurality of communication sectors 40, 42, 44, and 46. The communication system area 12 and 16 further includes a plurality of service processors. As shown, the service processors include a mobile switching center (MSC) for GSM telephony services 48, a mobile switching center for CDMA telephony services 50, a mobile data gateway (MDG) 52, dispatch service processors 60, 68, 76, and 86, video service processors 78 and 88, multimedia service processors 72 and 82, a data packet service processor 64, and a general telephony service processor via MSC 93.

In the illustration of FIG. 2, the MSC for GSM telephony 48, the MSC for CDMA telephony 50, and the MDG 52 provide service processing for the entire communication system area 12 and 16. The other types of service processors, however, provide service within a given communication sector 40, 42, 44 and 46. For example, communication sector 40 is shown to include a dispatch service processor 60 and a data packet service processor 64. Thus, for communication entities located within communication sector 40, the dispatch service processor 60 would process dispatch requests for such communication devices, while packet data processor 64 would process data packet requests for the communication entities. As is further shown, the dispatch processor 60 is operably coupled to a VLR 62 which stores a set of communication parameters for each communication entity affiliated with the dispatch service processor 60. A communication entity, which is one of an individual communication device, a group of communication devices, or a grouping of groups of communication devices, is affiliated with the dispatch service processor 60 when located within the coverage area of communication system sector 40 and when an authorized subscriber of dispatch service.

The dispatch service processor 60 processes a plurality of dispatch services including, but not limited to, dispatcher communications with an individual communication entity (which again may be a individual communication device, a group of communication devices or grouping of groups of communication devices), emergency services, priority calling, and group calls. For example, the dispatcher may be a state police dispatcher communicating with state troopers, such that the state troopers respond to police emergencies and/or other police situations.

The VLR 62 is a stand alone database or a portion of a data base that includes a plurality of entries. Each entry stores a corresponding set of communication parameters for each communication entity affiliated with the dispatch service processor 60. The corresponding set of communication parameters comprises a list of authorized, or subscribed to, dispatch services of a communication entity. Such dispatch services include priority access to communication resources, private calling, dispatch origination, emergency call processing, etc.

The data packet service processor 64 located within communicator sector 40, processes data packet transmission requests for communication entities located within communication sector 40. As shown, the data packet processor 64 is coupled to a visitor location register 66. The VLR 66 stores a corresponding set of communication parameters for each communication entity affiliated with the packet data service processor 64. The communication parameters include, but are not limited to, data packet transmissions, data packet receptions, priority transmissions, and other such data packeting services.

As mentioned, the MSC service processor for GSM telephony 48 provides GSM telephony services for the entire communication system area 12 and 16. The MSC service processor for GSM telephony 48 is coupled to its own VLR 54 which stores a corresponding set of communication parameters for each communication entity registered with the MSC 48. Such communication parameters include typical telephony services such as call forwarding, call waiting, short message services, or any other type of services available through GSM telephony.

Similarly, the MSC service processor for CDMA telephony 50 and the MDG service processor 52 each include their own VLR 56, 58, respectively, and service the entire communication system area 12, 14 and 16. The VLR 56 stores a corresponding set of communication parameters for each communication entity affiliated with the MSC service processor for CDMA telephony 50. The communication parameters include telephony services offered by a CDMA system such as call-forwarding, call-waiting, etc. The VLR 58 stores a corresponding set of communication parameters for each communication entity affiliated with the MDG service processor 52. Such communication parameters include text transmissions, and other types of data transmissions.

Communication system sector 42 is shown to include a dispatch service processor 68, its associated VLR 70, and a multimedia service processor 72, with its associated VLR 74. The dispatch service processor 68 and associated VLR 70 function in an identical manner as the dispatch processor 60 and associated VLR 62. The multimedia service processor 72 provides multimedia access for communication entities located within communication sector 42. The VLR 74 stores a corresponding set of communication parameters for each communication entity affiliated with the multimedia service processor 72. Such communication parameters include multimedia transmission, multimedia reception, multimedia generation, and other multimedia functions.

Communication system sector 44 is shown to include a multimedia service processor 82 with its associated VLR 84, a dispatch service processor 76 and video service processor 78. The dispatch service processor 72 and video service processor 78 are operably coupled to a VLR 80. In this sector 44, the multimedia service processor 82 and associated VLR 84 function in an identical manner as the multimedia service processor 72 and associated VLR 74.

The video service processor 78 provides video services for communication entities located within communication sector 44. The associated VLR 80 stores a set of communication parameters for each communication entity affiliated with the dispatch processor 76 and communication entities affiliated with the video service processor 78. In this instance, the dispatch service processor 76 and video service processor 78 share the VLR 80. As one having ordinary skill in the art will readily appreciate, a VLR may be shared by one or more service processors depending on the volume of information being processed and/or other sector requirements.

Communication system sector 46 includes a dispatch service processor 86, a video service processor 88, and a telephony service processor 93, each operably coupled to their own VLR 90, 91, 95. The telephony service processor 93 provides telephony services, similar to the CDMA MSC 48 and the GSM MSC 50, but only for communication entities located in the communication system sector 46. The VLR 95 stores a corresponding set of communication parameters for each communication entity affiliated with the telephony service processor 93.

As shown in FIG. 2, each of the service processors, 48, 50, 52, 60, 64, 68, 72, 76, 78, 82, 86, and 88 are operably coupled to the communication network 18. As coupled, each of the service processors may transceive information with other service processors, with other communication system areas, or with other communication systems. In addition, the communication network provides a path for the associated VLRs of the service processors to communicate with a distributed home location register to maintain accurate information regarding the communication entities affiliated therewith. As an alternative coupling mechanism, each of the associated VLRs may be directly coupled to the communication network 18.

The discussion with reference to FIG. 2 thus far has been for communication system areas 12 and 16. As shown in FIG. 1, communication system area 14 is operably coupled to a distributed visitor location register 22. The communication system area 14 includes all of the service processors shown in FIG. 2 wherein each of the service processors are coupled to the distributed visitor location register 22. In the distributed visitor location register, a communication service register would be included for each different type of service offered within the communication system area 14. For example, a separate communication service register would be present to support dispatch service, multimedia service, video service, GSM telephony service, CDMA telephony service, any other type of wireless telephony service, data packet service, and data gateway service. Alternatively, a separate communication register would be present to perform the equivalent functions of the VLRs 62, 66, 70, 74, 56, 58, 54, 80, 84, and 90 shown in FIG. 2. As one having ordinary skill in the art will readily appreciate, the allocation and/or quantity of communication service registers within a distributed visitor location register 22 may vary greatly depending on the requirements of the communication system area 14.

Figure 3:
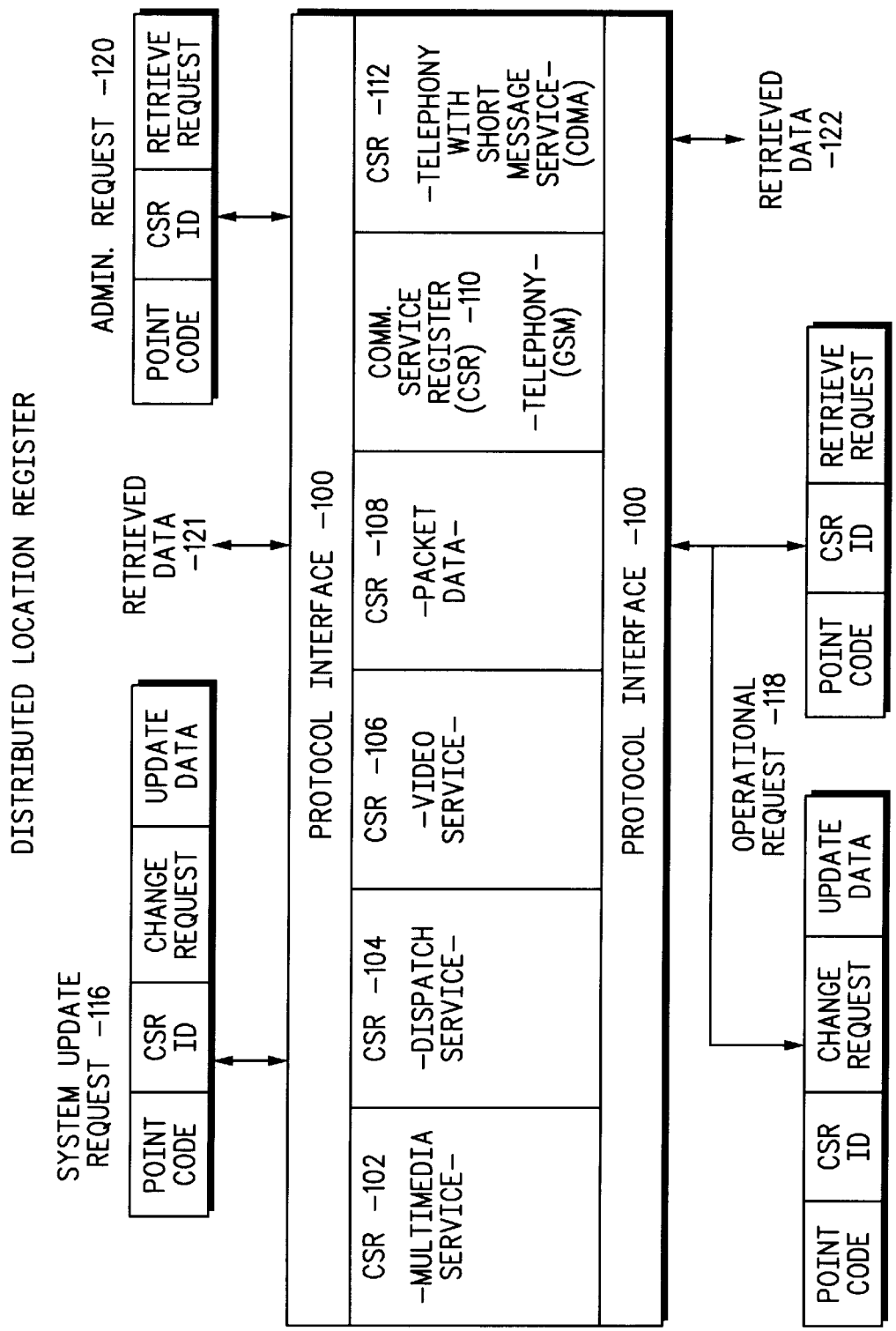
FIG. 3 is a schematic block diagram of a distributed location register which is in accordance with the present invention.

FIG. 3 is a schematic block diagram of a distributed location register which may be the distributed visitor location register 22, the distributed home location register 20, or a combination of the protocol interface 24 and the plurality of communication service registers 28–32. In any of these embodiments, the distributed location register includes a protocol interface 24 or 100 and a plurality of communication service registers 102–112 or 28–32. Each of the plurality of communication service registers 102–112 or 28–32, which is a database or portions thereof, stores corresponding sets of communication parameters corresponding to communication entities affiliated with the communication system, a communication system area, and/or a communication system sector.

The communication parameters indicate particular types of communication services the communication entity is authorized to access. For example, communication service register 102 stores corresponding sets of communication parameters for multimedia services. Communication service register 104 stores corresponding sets of communication parameters for dispatch services; communication service register 106 stores corresponding sets of communication parameters for video services; communication service register 108 stores corresponding sets of communication parameters for packet data services; communication service register 110 stores corresponding sets of communication parameters for GSM telephony services; and communication service register 112 stores CDMA telephony services which include short messaging services. By having the communication service registers storing communication parameters for the communication entities, data processing bottlenecking at the HLR is substantially eliminated. This features becomes of even greater importance as communication systems increase in the number of subscribers it supports and increase in the number of services they provide.

In operation, the distributed location register receives/sources a system update request 116, which instructs the distributed location register to update the corresponding set of communication parameters for a particular communication entity in any one of the plurality of communication service registers. The system update request 116 is received by the protocol-interface 100 which routes the request, or portions thereof, to the particular communication service register that was identified by the request.

The system update request 116 includes a point code field, a communication service register identification code field, a change request message field, and updated data field. The point code field indicates the particular distributed location register that is being addressed. Such a distinguishing point code is needed in communication systems that include a plurality of distributed home location registers, home location registers, and/or distributed visitor location registers. Such diversity, and hence the need for the point code, arises, for example, when a plurality of different service providers provide services on the same communication system. In such an instance, each of the service providers would include their own home location register, which would be identified by a unique point code. Alternatively, the need for point codes could arise due to capacity or redundancy concerns.

The communication service register identification code field of the system update request 116 identifies one of the plurality of communication service registers within the location register. The change request field identifies a particular communication entity and/or a particular communication parameter, or parameters, of the corresponding set of communication parameters. The updated data field includes the updated communication parameter or parameters for the identified communication entity.

The distributed location register further receives/sources, via protocol interface 100, an administrative request 120 which includes a point code field, a communication service register identification code field, and a retrieve data request field. The retrieve data request field identifies a particular communication parameter or parameters of a particular communication entity that is to be retrieved. The point code field and the communication service register field are as previously discussed with reference to the system update request 116. When the addressed communication service register has retrieved the requested data, the protocol interface 100 provides the retrieved data 121 to the communication network 18 such that it may be provided to the requesting entity. In such a communication system environment, the requesting entity may be a system administrator for the communication system, a communication system area, or a communication system sector.

The distributed location register still further receives/sources, via the protocol interface 100, operational requests and subsequently provides the requests, or a portion thereof, to the appropriate communication service register. The operational request are received in one of two formats. The first operational request 118 format includes a point code identification field, a communication service register identification code field, a change request field, and an updated data field. These fields are identical to the fields of the system update request 116 as far as content but are originated by a service processor, its associated VLR, or the distributed VLR. The second operational request 118 format includes a point code field, a CSR identification code field, and a retrieved request message. This format is similar to the administrative request 120 format discussed above. Once the requested data has been retrieved, the protocol interface 100 provides the retrieved data 122 to the communication network 18. Note that the difference between an operational request 118 and the system update request 116 and administrative request 120 is the originator. For operational requests 118, the originator is a service processor, its associated VLR, or the distributed VLR, while, for the other requests 116 and 120, the originator is a system administrator.

Figure 4:
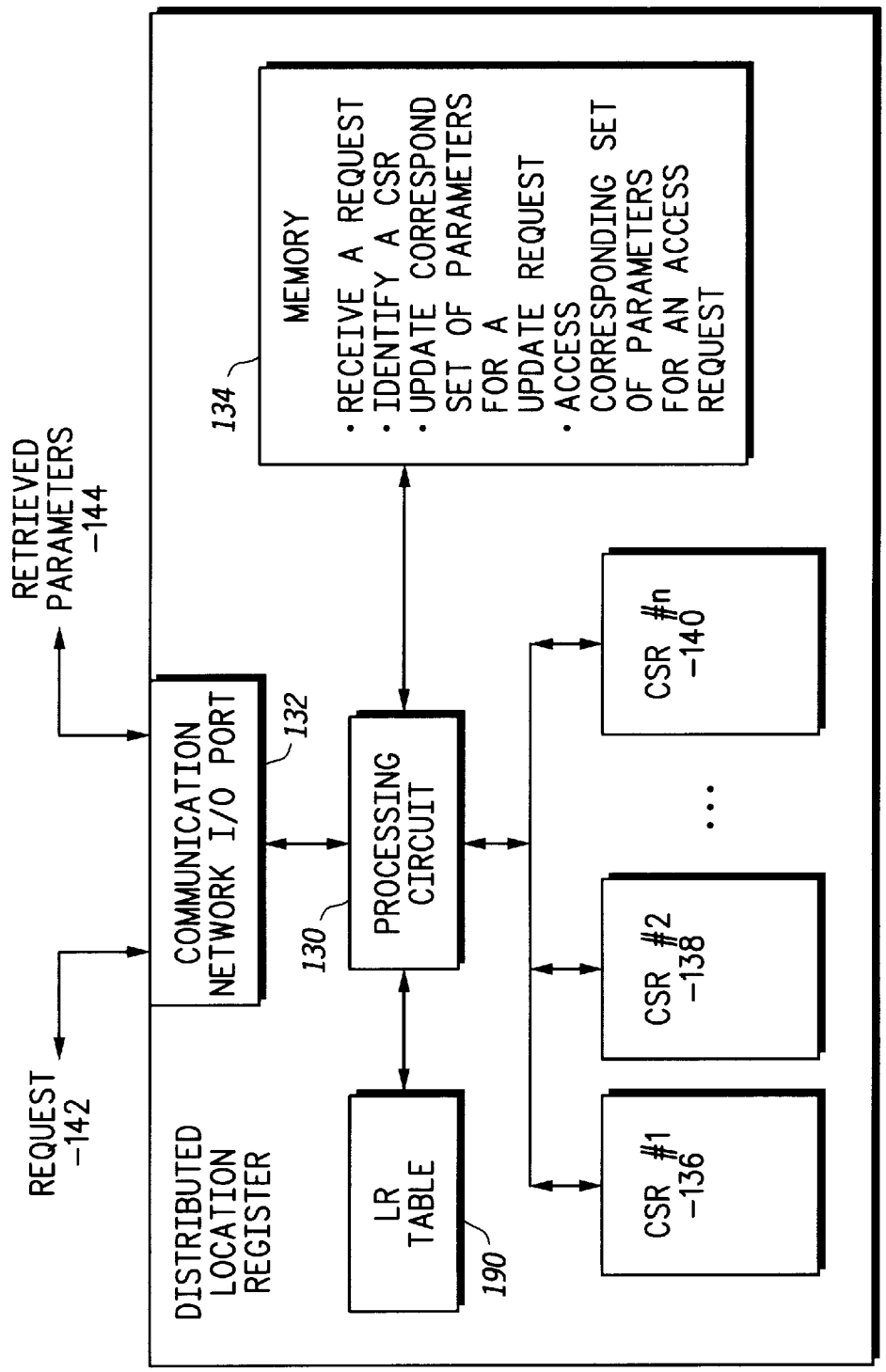
FIG. 4 is a schematic block diagram of an alternate distributed location register which is in accordance with the present invention.

FIG. 4 is a schematic block diagram of an alternate distributed location register 20, 22, or the combination of the protocol interface 24 and the plurality of communication service registers 28–32. As shown, the distributed location register includes a communication network input/output port 132, a processing circuit 130, memory 134, a location register (LR) table 190 (which is discussed in detail with reference to FIG. 7), and a plurality of communication service registers 28–32 or 136–140. The plurality of communication service registers 28–32 or 136–140 are identical to the communication service registers 102–112 of FIG. 3. As such no further discussion will be presented for the communication service registers illustrated in FIG. 4. The processing circuit 130 is at least one of a microprocessor, a micro-controller, a microcomputer, a stand-alone computer, a central processing unit, or any other device that processes digital information based on programming instructions.

In operation, the distributed location register is operably coupled to receive/source a request 142 via the communication network input/output port 132. When the request 142 is to be received, the processing circuit 130 evokes the algorithm stored in memory 134. Upon evoking the algorithm, the processing circuit 130 receives the request and subsequently identifies a particular communication service register identified in the request. Having done this, the processing circuit 130 determines whether the request is for updating a corresponding set of communication parameters and/or accessing the corresponding set of communication parameters. When the request is for updating the corresponding set of communication parameters, the processing circuit 130 causes the corresponding set of parameters to be updated based on the updated information within the request 142. If, however, the request 142 is for retrieval (i.e., accessing) of a particular parameter or parameters from the corresponding set of communication parameters, the processing circuit 130 addresses the appropriate communication service register to retrieve the requested parameters. Having done so, the processing circuit 130 receives from the appropriate CSR the retrieved parameters 144 and provides them to the network via the communication network input/output port 132.

Figure 5:
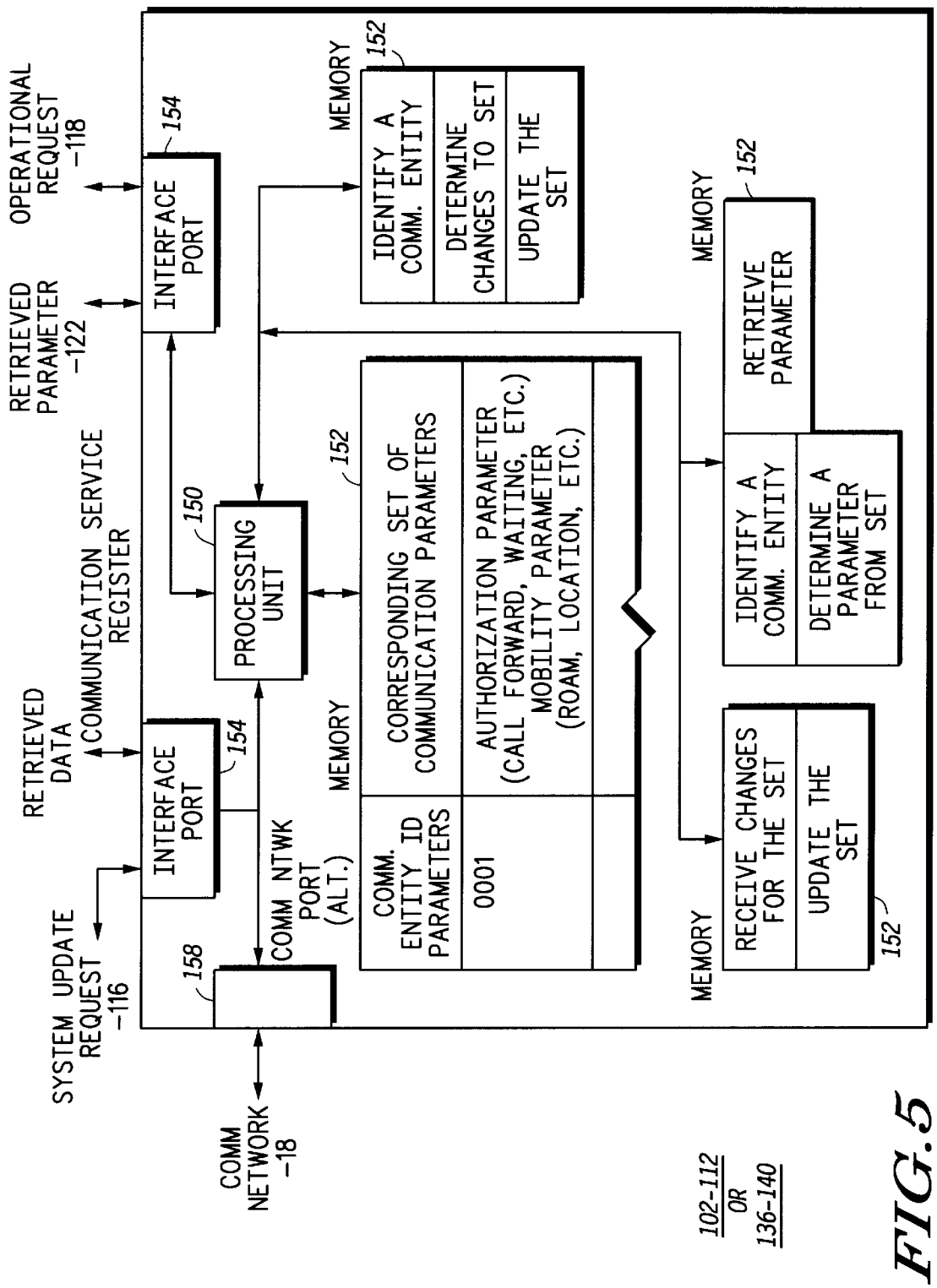
FIG. 5 is a schematic block diagram of a communications service register which is in accordance with the present invention.

FIG. 5 is a schematic block diagram of a communication service register 28–32, 102–112 or 136–140. The communication service register includes a processing circuit 150, memory 152, an interface port 154, and (optionally) a communication network port 158. The processing circuit 150 is one of a digital signal processor, a microprocessor, a microcontroller, a microcomputer, a central processing unit, a computer, or any other device that processes digital information based on programming instructions. In operation, the processing circuit 150 receives/sources system update requests 116 or operational requests 118, via the interface port 154 and/or the communication network port 158. Note that the communication service register would only include the communication network port 158 if it is directly coupled to the communication network as shown, for example, in FIG. 1. Alternatively, the communication service register would only include the interface port 154 if coupled to the protocol interface 24 as shown in FIG. 1, is part of the distributed home location register 20, or is part of the distributed visitor location register 22.

Memory 152, which is a database or portion thereof, includes a communication entity table that contains communication entity identification parameters and corresponding set of communication parameters. As previously mentioned, a communication entity is one of an individual communication device, a group of communication devices, or grouping of groups of communication devices. The corresponding set of communication parameters includes authorization parameters such as call-forwarding, call-waiting, caller I.D., etc., or telephony services. The communication parameters further include mobility parameters, such as roaming capabilities, a current location, and current visitor location register affiliation(s).

When a request is to be received, the processing circuit 150 evokes any one of a number of programs stored in memory 152. For example, when a request is received, the processing circuit 150 evokes a program which causes it to identify a particular communication entity from the received request. Having made this determination, the processing circuit 150 determines the changes, or updates, required for the corresponding set of communication parameters of the identified communication entity. Having determined the changes, the processing circuit 150 updates, within memory 152, the corresponding set of communication parameters for the identified communication entity.

The processing circuit 150 alternatively retrieves programming instructions which cause it to receive the changes for the corresponding set of communication parameters and subsequently update the corresponding set to include the changes. As yet another alternate method for processing requests, the processing circuit 150 identifies the particular communication entity from the request. Having made this identification, the processing circuit 150 then determines a particular parameter(s) from a set of corresponding communication parameters of the identified communication entity. Having determined the particular parameter(s), the parameter(s) is retrieved and subsequently provided to the requesting entity via the interface port 154 or the communication network port 158.

Figure 6:
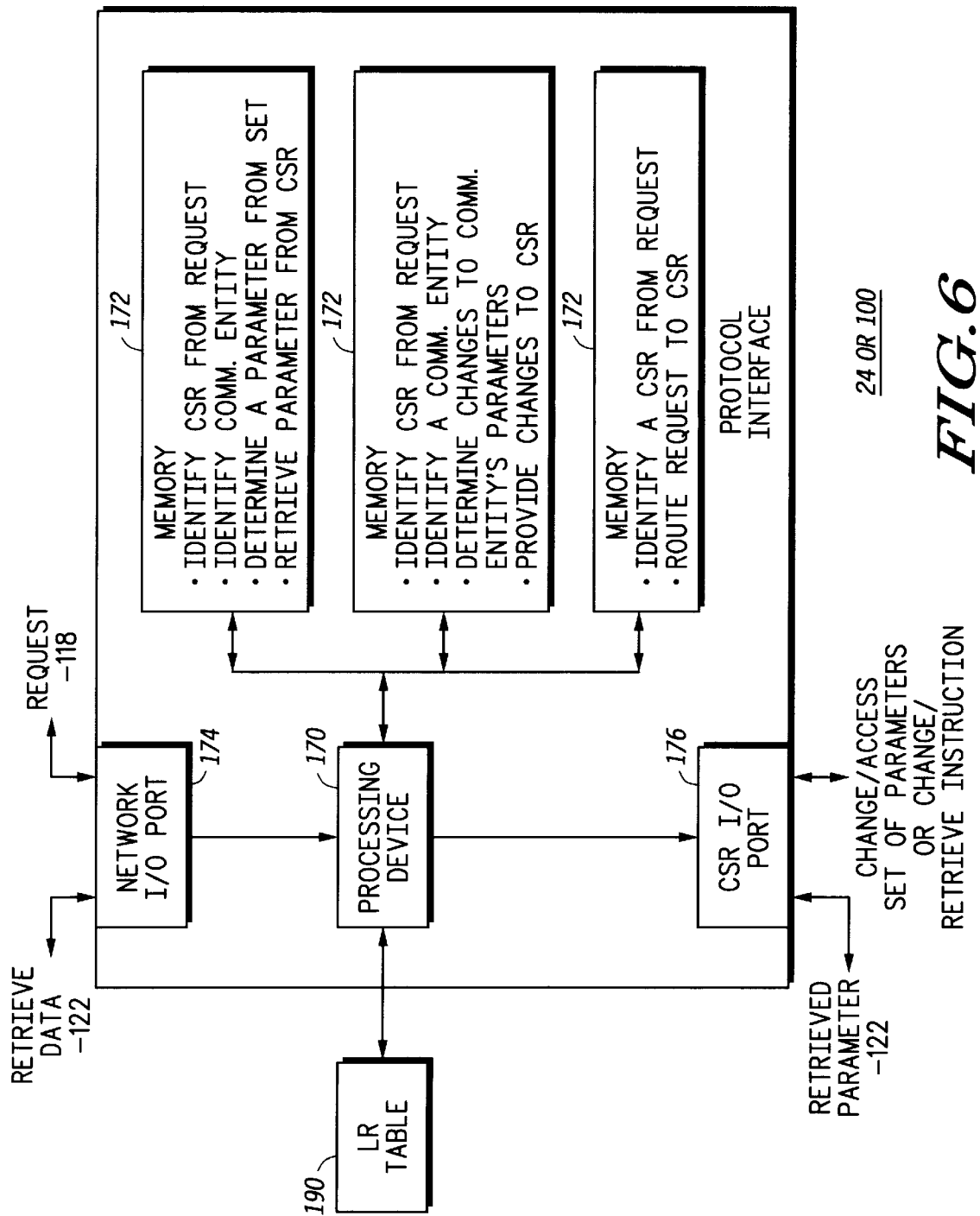
FIG. 6 is a schematic block diagram of a protocol interface which is in accordance with the present invention.

FIG. 6 is a schematic block diagram of a protocol interface 24 or 100. The protocol interface 24 or 100 includes a processing device 170, memory 172, a network input/output port 174, an LR table 190, and a communication service register input/output port 176. The processing device 170 is one of a digital signal processor, a microcomputer, a microcontroller, a central processing unit, a computer, or any other device that processes digital information based on programming instructions.

In operation, the processing device 170 receives/sources a request 118 from/to a service processor, a system administrator, or a distributed location register via the network input/output port 174. Upon receiving the request 118, the processing device 170 evokes any one of the number of algorithms stored in memory 172. Such algorithms are discussed in further detail below with respect to FIGS. 11, 13 and 14.

Figure 7:
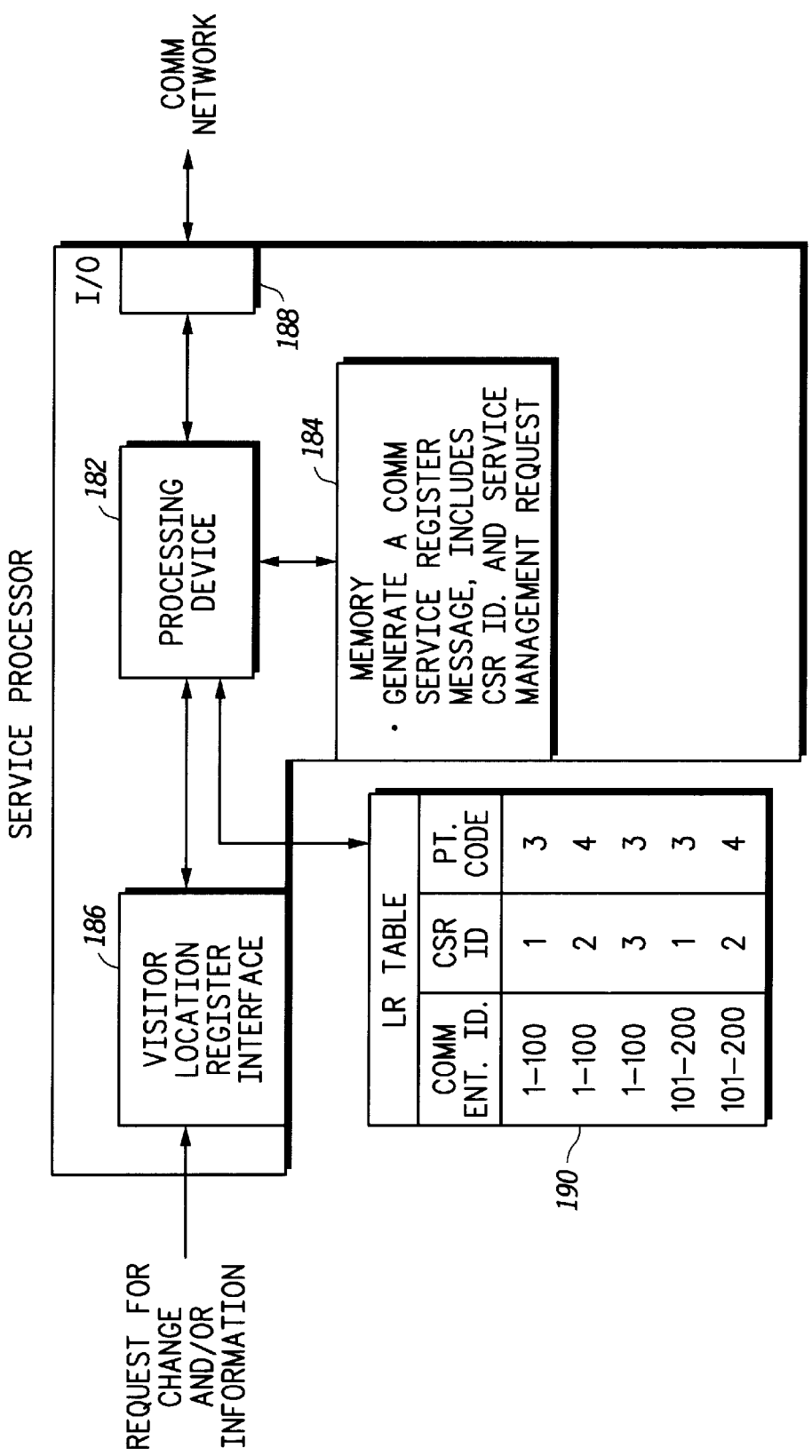
FIG. 7 is a schematic block diagram of a service processor which is in accordance with the present invention.

FIG. 7 is a schematic block diagram of a service processor 60, 64, 48, 50, 52, 68, 72, 76, 78, 82, 86 and 88. The service processor includes a processing device 182, memory 184, a visitor location register interface 186, and an input/output port 188. The input/output port 188 allows the service processor to communicate with the communication network 18. The visitor location register interface 186 allows the service processor to communicate with its visitor location register or a distributed visitor location register 22.

Also shown in FIG. 7 is an LR (location register) table which includes a communication entity identification field, a communication service register identification field, and a point code field. The point code field stores point code information which identifies a particular HLR. The communication service register identification code identifies a particular communication service register within a particular home location register. The communication entity field identifies a communication entity which is affiliated with the particular communication service register. Note that the location register table 190 is typically located within the visitor location register associated with the service processor.

In operation, the visitor location register provides/receives a request, which indicates a change to the parameters of a corresponding set of parameters for a particular communication entity or for the retrieval of communication parameters of a communication entity, to/from a service processor via the location register interface 186. Upon receiving the request, the processing device 182 evokes the programming instructions stored in memory 184. Such programming instructions cause the processing device 182 to generate a communication service register message which includes the communication service register identification code and the particular service request being requested. Having generated the communication service register request, the processing device 182 provides it to the communication network via the input/output port 188. Note that the processing device 182 is at least one of a digital signal processor, microprocessor, microcomputer, microcontroller, central processing unit, computer, or any other processing device that manipulates digital data based on programming instructions.

Figure 8:
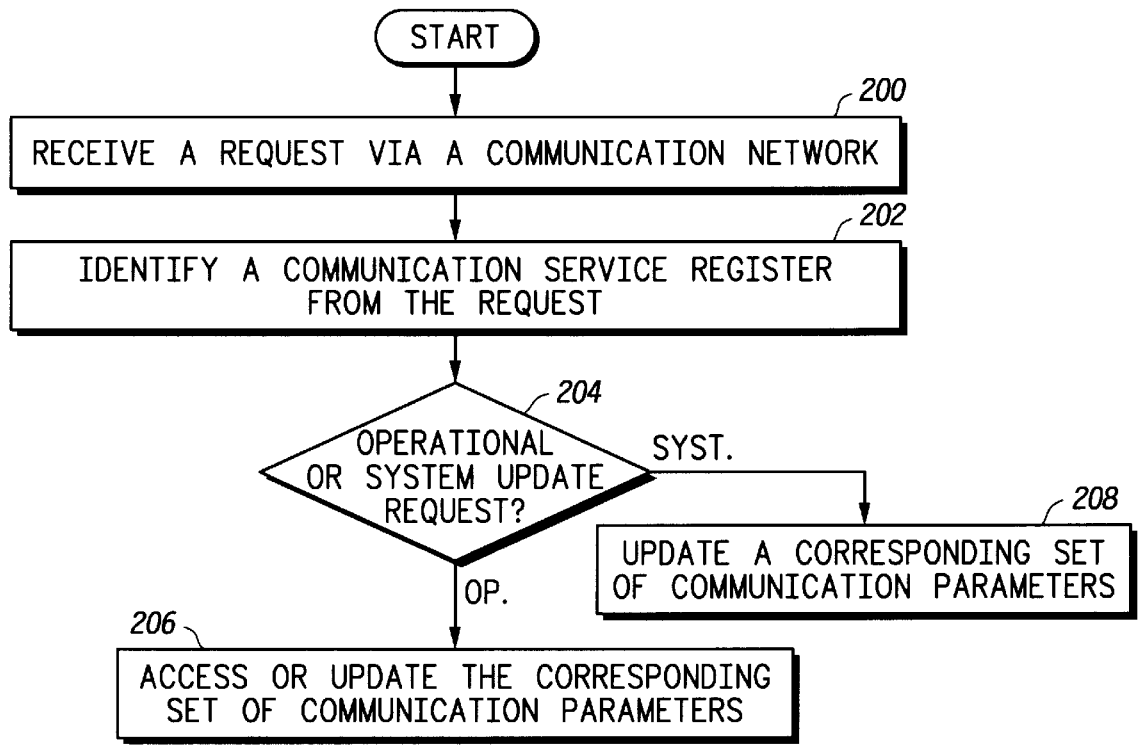
FIG. 8 is a flowchart illustrating a method for processing a request within a distributed location register in accordance with the present invention.

FIG. 8 is a flowchart of a method for processing a request within a distributed location register. The process begins at step 200 where a request is received via the communication network. The request is originated from a visitor location register affiliated with any one of the communication system areas or from a system administrator. Having received the request, the process proceeds to 202 where a communication service register is identified from the request. The identification of a particular communication service register from the request will be discussed below with reference to FIG. 9.

Having identified the particular communication service register, the process proceeds to step 204 where a determination is made as to whether the request is an operational request or a system update request. If the request is an operational request, the process proceeds to step 206 where a corresponding set of communication parameters for a particular communication entity are retrieved or updated. As previously mentioned, an operational request typically originates from a visitor location register and requests the retrieval or updating of a communication parameter(s) for a particular communication entity, so that the visitor location register obtains the most current data for the particular communication entity or entities.

If, however, the request is for a system update request, the process proceeds to step 208. At step 208, a corresponding set of communication parameters are updated based on the particular request. The system update request typically originates from a system administrator of a particular service provider and may indicate a change to the authorization parameters of a particular communication entity. For example, the change could be for changing the status of call-waiting, call-access, call-forwarding, etc. or could be for changing mobility parameters of the particular communication entity.

Figure 9:
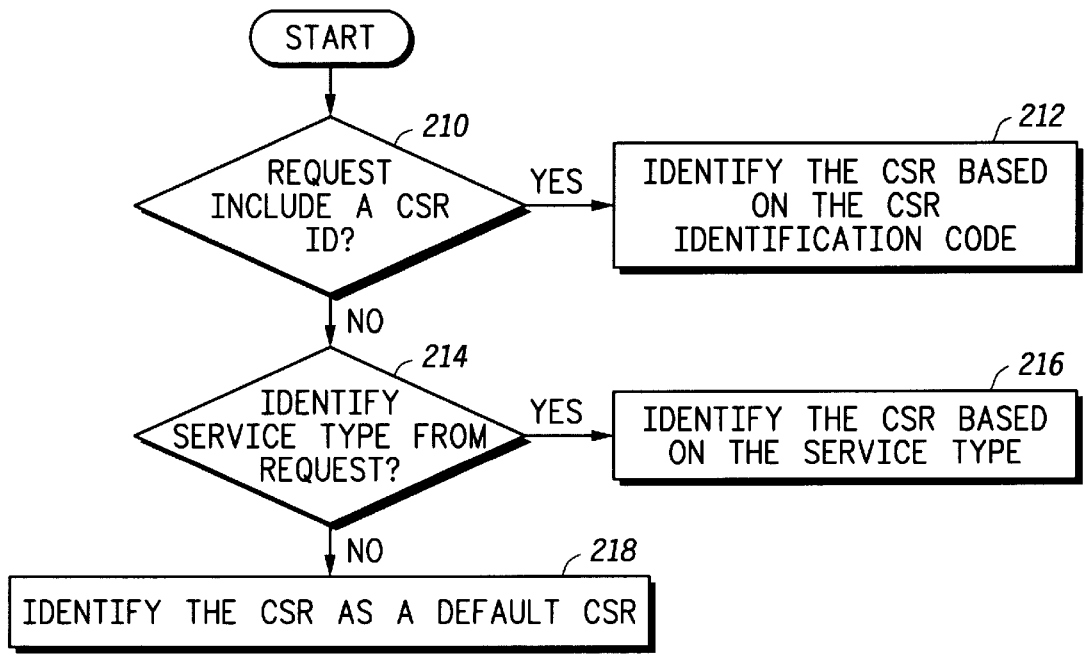
FIG. 9 is a flowchart illustrating a method for determining the identity of a communication service register of the distributed location register in accordance with present invention.

FIG. 9 is a flowchart illustrating a method for determining the identity of a communication service register of the distributed location register. The process begins at step 210 where a determination is made as to whether the particular request includes a communication service register identification code. As previously mentioned, each communication service register of the distributed home location register, or the distributed visitor location register, includes an individual identification code, or address. The communication service register identification code, along with the point code, provide sufficient identification such that any communication service register in the communication system can be addressed. If the request includes the communication service register identification code, the process proceeds to step 212 where the identity of the particular communication service register is determined based on the identification code contained within the request.

If, however, the request does not include a communication service register identification code, the process proceeds to step 214 where a determination is made as to whether the communication service register can be identified based on a particular service type being requested. As previously mentioned, each communication service register supports a particular service(s), such as telephony services, telephony service with short messaging service, video service, multimedia service, packet data service, and dispatch service. By ascertaining a particular type of service, the process proceeds to step 216 where the particular communication service register is identified based on the particular service type of the request and/or the service processor that initiated the request. If, however, the particular service type cannot be identified from the request, the process proceeds to step 218 where a default communication service register is identified, i.e., one of the communication service registers is identified as the default CSR or a separate CSR is added to the system to function in the default case.

Figure 10:
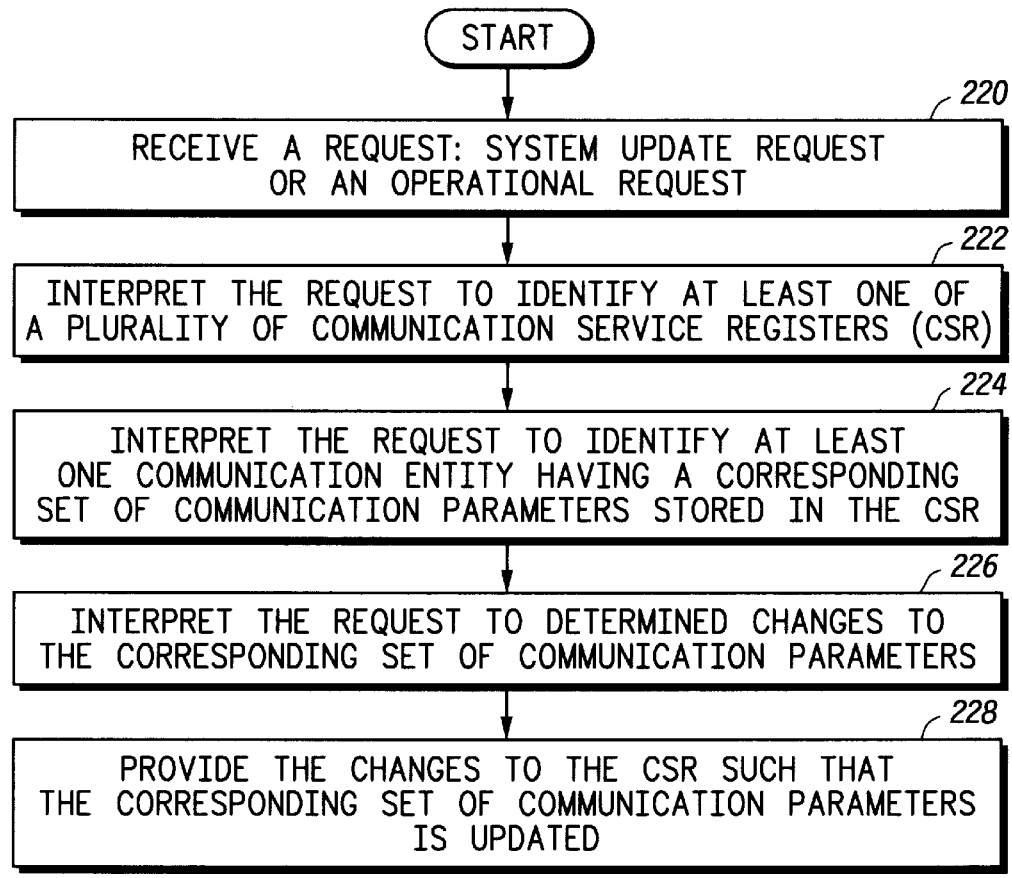
FIG. 10 is a flowchart illustrating a method for processing a request within a distributed location register in accordance with the present invention.

FIG. 10 is a flowchart illustrating a method for processing a request within a distributed location register. The process begins at step 220 where a request is received as either a system update request or an operational request. The system update request is a request for data change, such as a service authorization change. The operational request is a request for retrieval of data for: service management and maintenance purposes, visitor location register location information, visitor location register supplemental services, visitor location register updating, call routing, and fault recovery. Note that service management and maintenance involves periodic checking of the overall system operation. The VLR location determines with which VLR a particular communication entity has an affiliation. VLR supplemental services indicate the particular services supported by a VLR, and system updating, call routing, and fault recovery insure that the visitor location register to which the particular communication entity is affiliated has the appropriate information regarding the particular communication entity.

The process then proceeds to step 222 where the request is interpreted to identify one of the plurality of communication service registers. The identification of at least one of the plurality of communication service registers is done as previously described with reference to FIG. 9. The process then proceeds to step 224 where the request is interpreted to identify at least one communication entity which has a corresponding set of communication parameters that is stored in the previously identified communication service register. Next, the process proceeds to step 226 where the request is further interpreted to determine changes to the corresponding set of communication parameters. As previously mentioned, such changes may occur due to service authorization changes, service management operation and maintenance issues, system update for the VLR, and fault recovery. Having identified the particular communication service register, the particular communication entity, and the changes to be made to its corresponding set of communication parameters, this information is provided to the communication service register at step 228. Upon receipt of this information, the communication service register updates or retrieves, based on the type of request, the corresponding set of communication parameters for the particular communication entity.

Figure 11:
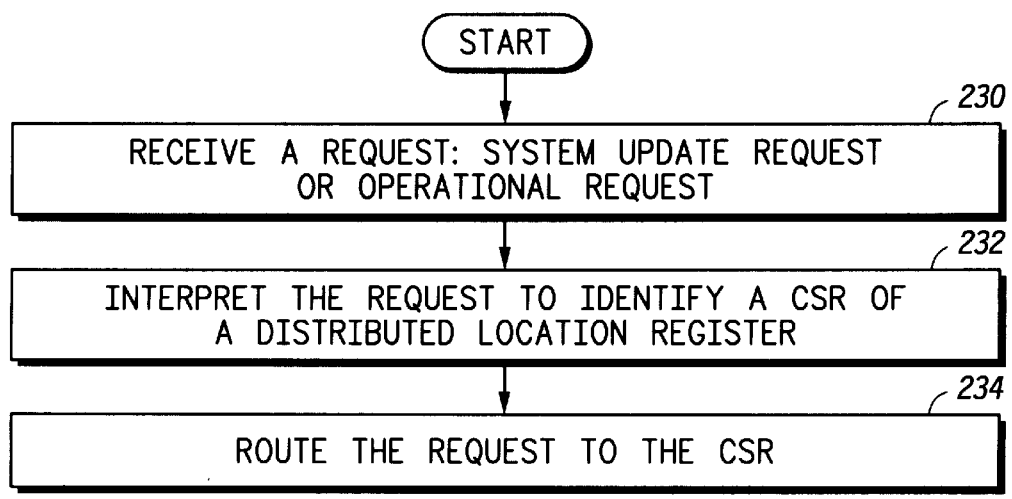
FIG. 11 is a flowchart illustrating a method for processing a request by a protocol interface in accordance with the present invention.

FIG. 11 is a flowchart illustrating a method for processing a request by a protocol interface. The process begins at step 230 where a system update request or operational request is received. Having received the request, the process proceeds to step 232 where the request is interpreted to identify a communication service register of a distributed location register. Next, the process proceeds to step 234 where the request is routed to the identified communication service register. Note that by having a plurality of communication service registers, services can be added to, modified, or deleted from the communication system without effecting the entire distributed location register. In addition, by having the plurality of communication service registers, the communication system is scaleable to include more or less services, and avoids the issues of having a data processing bottleneck at a location register when a significant number of system update requests and operational requests are being generated.

Figure 12:
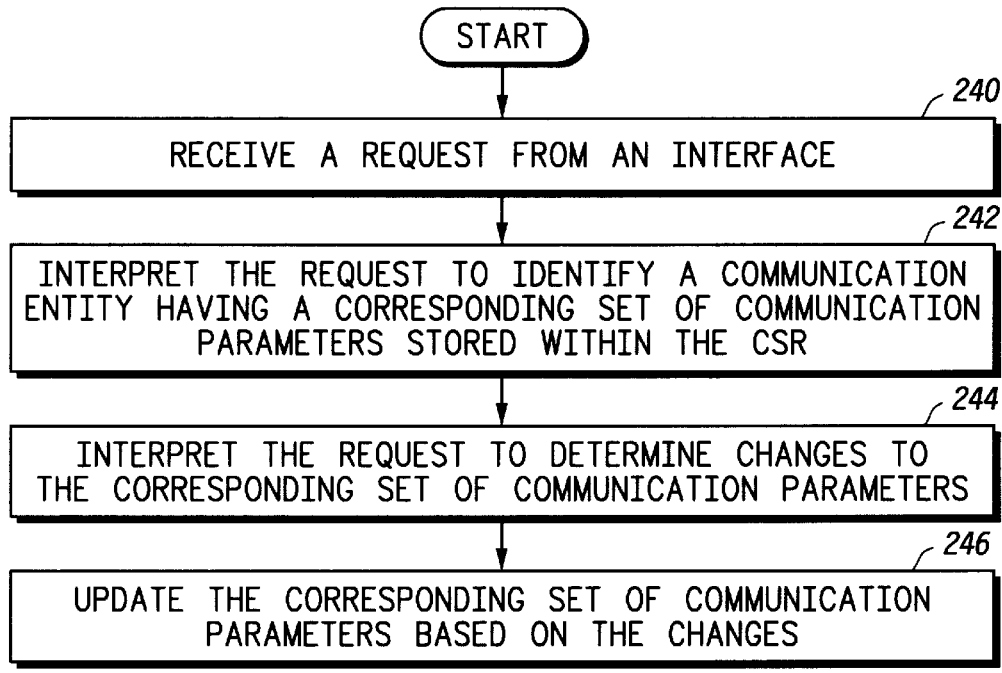
FIG. 12 is a flowchart illustrating a method for processing a request by a communication service register in accordance with the present invention.

FIG. 12 is a flowchart illustrating a method for processing a request by a communication service register. The process begins at step 240 where the communication service register receives a system update request from a protocol interface. Having received the request, the process proceeds to step 242 where the communication service register interprets the request to identify a communication entity having a corresponding set of communication parameters which are stored within the communication service register.

The process then proceeds to step 244 where the communication service register interprets the request to determine changes to the corresponding set of communication parameters. Having identified the particular changes, the process proceeds to step 246 wherein the communication service register updates the corresponding set of communication parameters based on the changes.

Figure 13:
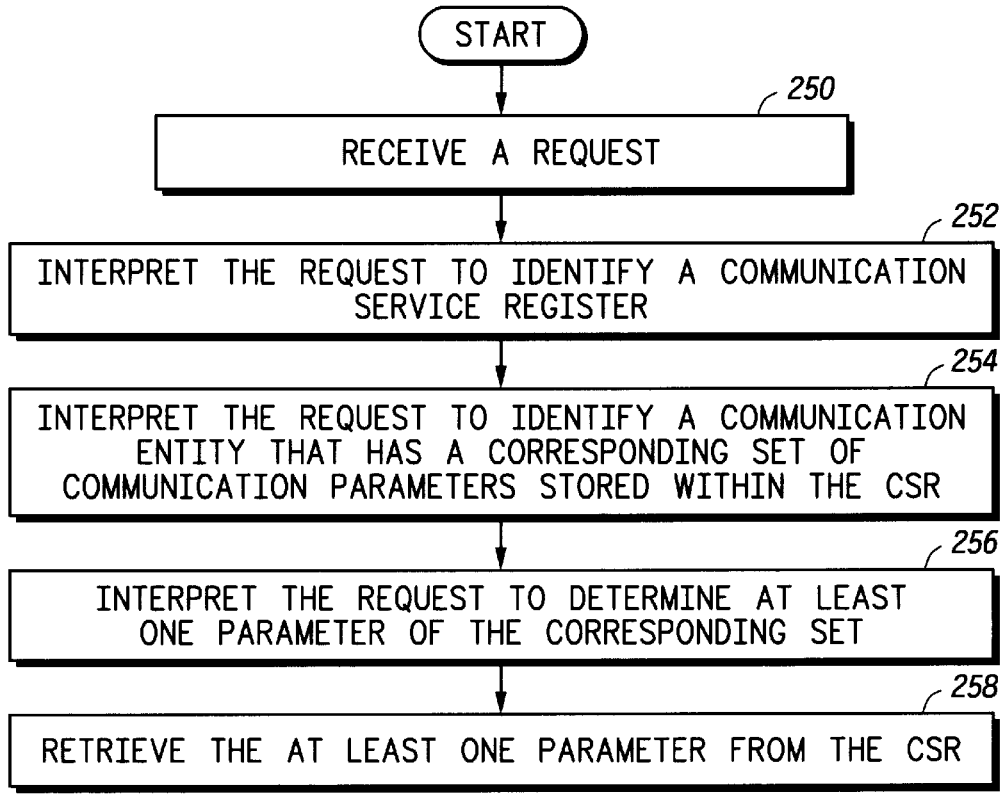
FIG. 13 is a flowchart illustrating another method for processing a request by a protocol interface in accordance with the present invention.

FIG. 13 is a flowchart illustrating another method for processing a request by a protocol interface. The process begins at step 250 where the protocol interface receives a request which is requesting the retrieval of at least one of the communication parameters of a communication entity. Upon receiving the request, the process proceeds to step 252 where the protocol interface interprets the request to identify a communication service register. Having identified the particular communication service register, the process proceeds to step 254 where the protocol interface interprets the request to identify the communication entity that stores the corresponding set of communication parameters.

Having identified the communication service register and the communication entity, the process proceeds to step 256 where the protocol interface interprets the request to determine at least one parameter of the corresponding set of communication parameters to be retrieved. Having made this determination, the process proceeds to step 258 where at least one parameter is received from the communication service register as a retrieved parameter.

Figure 14:
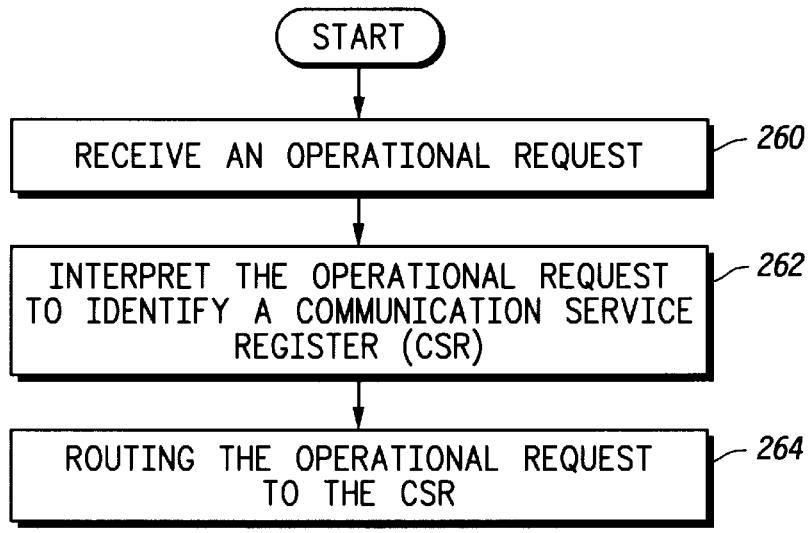
FIG. 14 is a flowchart illustrating yet another method for processing a request by a protocol interface in accordance with the present invention.

FIG. 14 is a flowchart illustrating yet another method for processing a request by a protocol interface. The process begins at step 260 where the protocol interface receives an operational request. As previously mentioned, an operational request is for service management operation and maintenance, a visitor location register location, visitor location register supplemental service, system update for the VLR, call-waiting and fault recovery.

Having received the operational request, the process proceeds to step 262 where the protocol interface interprets the operational request to identify a communication service register. Having identified the communication service register, the protocol interface, at step 264, routes the operational request to the communication service register.

Figure 15:
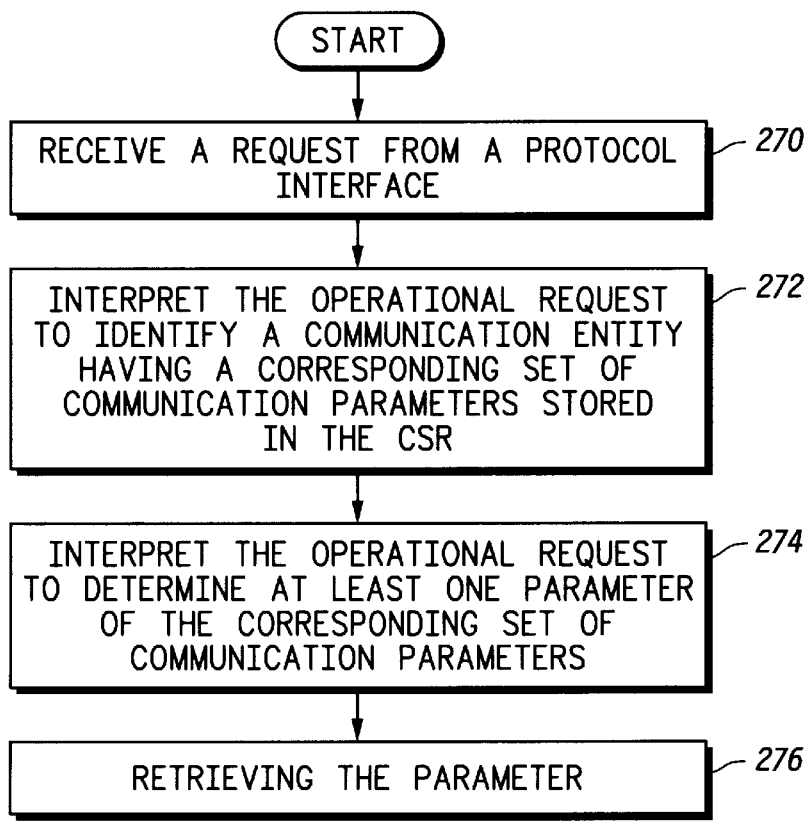
FIG. 15 is a flowchart illustrating a method for processing a request by a communication service register in accordance with the present invention.

FIG. 15 is a flowchart illustrating a method for processing a request by a communication service register. The process begins at step 270 where the communications service register receives an operational request from a protocol interface. Next, the process proceeds to step 272 where the communication service register interprets the operational request to identify a communication entity having a corresponding set of communication parameters stored within the communications service register.

Having identified the particular communication entity, the process proceeds to step 274 where the communication service register interprets the operational request to further determine that at least one parameter of the corresponding set of parameters is to be retrieved. Having made this determination, the process proceeds to step 276 where the communication service register retrieves the parameter and provides it to the requesting entity via the protocol interface.

The preceding discussion has presented a method and apparatus for distributed location registers. Such distributed location registers may be for a home location register or a visitor location register. By including a plurality of communication service registers within a distributed location register, the service functionality offered by a communication system may be partitioned thereby allowing scalability of the communication system. In addition, communication systems incorporating distributed location registers as disclosed herein avoid data processing bottlenecks.

We claim:

1. A distributed location register comprising:
one or more communication service registers, each being associated with a different type of communication service and containing communication parameters for a number of communication entities; and
a protocol interface operably coupled to the one or more communication service registers, the protocol interface facilitating accessing or updating, responsive to a request by at least one of the communication entities, one or more of the communication parameters in a selected one or more of the communication service registers, wherein the request comprises:
a communication service register identification code identifying a selected one of the communication service registers;
a change request field identifying at least one communication parameter to be changed in the selected one of the communication service registers; and
an update data field identifying changes to be made in the at least one communication parameter in the selected one of the communication service registers.

2. A method comprising the steps of:
receiving, by a protocol interface, a request from a communication entity;
interpreting the request to identify at least one selected communication service register storing communication parameters associated with a particular type of communication service, by determining at least one service type of the request, wherein the at least one service type is used to identify the at least one selected communication service register;
interpreting the request to identify a selected one or more communication parameters to be changed in the at least one selected communication service register;
interpreting the request to determine changes to be made in the selected one or more communication parameters; and
providing the changes to the selected communication service register such that it updates the selected one or more communication parameters.

3. The method of claim 2, wherein the step of determining the at least one service type comprises determining an identity of a service processor that initiated the request.

4. The method of claim 2, wherein the at least one service type is one of: telephony services, telephony with short message service, video service, multimedia service, packet data service, and dispatch service.

5. A method comprising the steps of:
receiving, by a protocol interface, a request from a communication entity;
interpreting the request, by the protocol interface, to identify at least one selected communication service register storing communication parameters associated with a particular type of communication service and to determine at least one service type of the request, wherein the at least one service type is used to identify the at least one of the plurality of communication service registers;
interpreting the request to identify a selected one or more communication parameters to be changed in the at least one selected communication service register;
interpreting the request to determine changes to be made in the selected one or more communication parameters; and
providing the changes to the selected communication service register such that it updates the selected one or more communication parameters.

6. The method of claim 5, wherein the at least one service type is one of: telephony service, telephony with short message service, video service, multimedia service, data packet service, and dispatch service.

7. A method comprising the steps of:
receiving, by a protocol interface, a request from a communication entity;
interpreting the request, by the protocol interface to identify at least one selected communication service register storing communication parameters associated with a particular type of communication service;
identifying the at least one selected communication service register as a default communication service register when the at least one selected communication service register cannot be directly identified by the request;
interpreting the request to identify a selected one or more communication parameters to be changed in the at least one selected communication service register;
interpreting the request to determine changes to be made in the selected one or more communication parameters;
providing the changes to the selected communication service register such that it updates the selected one or more communication parameters.

8. A method for a protocol interface of a distributed location register, the method comprising the steps of:
a) receiving a request;
b) interpreting the request to identify at least one of a plurality of communication service registers, and to further determine at least one service type of the request, wherein the at least one service type is used to identify the at least one of the plurality of communication service registers;
c) interpreting the request to identify at least one of a plurality of communication entities having a corresponding set of communication parameters stored within the at least one of the plurality of communication service registers;
d) interpreting the request to determine at least one parameter of the corresponding set of communication parameters; and
e) retrieving the at least one parameter from the at least one of the plurality of communication service registers.

9. The method of claim 8, wherein the at least one service type is one of: telephony service, telephony with short message service, video service, multimedia service, packet data service, and dispatch service.

10. A communication service register for use within a distributed location register, the communication service register comprising:
a protocol interface port operably coupled to receive a request, wherein the request includes a communication service register identification code and a point code that identifies the distributed home location register;
a processing circuit operably coupled to receive the protocol interface port; and
a memory operably coupled to the processing circuit, wherein the memory contains a plurality of entries, each entry of the plurality of entries stores a corresponding set of communication parameters for each of a plurality of communication entities, the memory further comprising programming instructions, that when read by the processing circuit, cause the processing circuit to:
interpret the request to identify at least one of a plurality of communication entities having the corresponding set of communication parameters stored within the communication service register;
interpret the request to determine changes to the set of communication parameters; and
update the corresponding set of communication parameters based on the changes.

11. A communication service register for use within a distributed location register, the communication service register comprising:
a protocol interface port operably coupled to receive a request, wherein the request includes a communication service register identification code and a point code that identifies the distributed home location register;
a processing circuit operably coupled to receive the protocol interface port; and
a memory operably coupled to the processing circuit, wherein the memory contains a plurality of entries, each entry of the plurality of entries stores a corresponding set of communication parameters for each of a plurality of communication entities, the memory further comprising programming instructions, that when read by the processing circuit, cause the processing circuit to:
receive changes for the corresponding set of communication parameters of at least one of a plurality of communication entities and
update the corresponding set of communication parameters based on the changes.

12. A communication service register for use within a distributed location register, the communication service register comprising:
a protocol interface port operably coupled to receive a request, wherein the request includes a communication service register identification code and a point code that identifies the distributed home location register;
processing circuit operably coupled to receive the protocol interface port; and
memory operably coupled to the processing circuit, wherein the memory contains a plurality of entries, each entry of the plurality of entries stores a corresponding set of communication parameters for each of a plurality of communication entities, the memory further comprising programming instructions, that when read by the processing circuit, cause the processing circuit to:
interpret the request to identify at least one of a plurality of communication entities having the corresponding set of communication parameters stored within the communication service register;
interpret the request to determine at least one parameter of the corresponding set of communication parameters; and
retrieve the at least one parameter of the corresponding set of communication parameters of the at least one of the plurality of communication entities.

13. A method for a distributed location register comprising the steps of:
a) receiving a request via a communication network;
b) identifying one of a plurality of communication service registers of the distributed location register based on service type of the request being one of: telephony services, telephony with short message services, video services, multimedia services, packet data services, and dispatch services;
c) updating a corresponding set of communication parameters for one of a plurality of communication entities stored within the one of the plurality of communication service registers when the request indicates updating the corresponding set of communication parameters; and d) accessing the corresponding set of communication parameters for an identified one of the plurality of communication entities when the request indicates accessing the corresponding set of communication parameters.

14. A distributed location register comprising:

a communication network input/output port operably coupled to receive a request via a communication network;

a plurality of communication service registers, wherein each of the plurality of communication service registers contains a corresponding set of communication parameters for each of a plurality of communication entities;

a processing circuit operably coupled to the communication network input/output port and the plurality communication service registers; and memory that stores programming instructions that, when read by the processing circuit, cause the processing circuit to function as (a) a receiving circuit that receives the request via the communication network input/output port; (b) identifying circuit that identifies one of the plurality of communication service registers of the distributed home location register from the request; (c) an updating circuit that updates a corresponding set of communication parameters for one of a plurality of communication entities stored within the one of the plurality of communication service registers when the request indicates updating the corresponding set of communication parameters; and (d) an accessing circuit that accesses the corresponding set of communication parameters for an identified one of the plurality of communication entities when the request indicates accessing the corresponding set of communication parameters.

* * * * *